(12) United States Patent
Wiedenhoeft (10) Patent No.: US 11,707,049 B2
(45) Date of Patent: Jul. 25, 2023

(54) PET PERCH

(71) Applicant: Shoulder Cats R Us, LLC, Parker, CO (US)

(72) Inventor: Debra Lynne Wiedenhoeft, Parker, CO (US)

(73) Assignee: Shoulder Cats R Us, LLC, Parker, CO (US)

( * ) Notice: Subject to any disclaimer, the term of this patent is extended or adjusted under 35 U.S.C. 154(b) by 857 days.

(21) Appl. No.: 16/589,769

(22) Filed: Oct. 1, 2019

(65) Prior Publication Data
US 2020/0029528 A1 Jan. 30, 2020

Related U.S. Application Data

(63) Continuation-in-part of application No. 29/642,963, filed on Apr. 3, 2018, now Pat. No. Des. 907,314, which is a continuation of application No. PCT/US2018/025850, filed on Apr. 3, 2018.

(60) Provisional application No. 62/482,372, filed on Apr. 6, 2017.

(51) Int. Cl.
*A01K 1/02* (2006.01)
*A45F 3/14* (2006.01)

(52) U.S. Cl.
CPC ............... *A01K 1/029* (2013.01); *A45F 3/14* (2013.01); *A45F 2003/148* (2013.01)

(58) Field of Classification Search
CPC ..... A01K 1/029; A45F 3/14; A45F 2003/148; A45F 2003/144; A45F 3/12; A45F 3/04; A45F 3/00
See application file for complete search history.

(56) References Cited

U.S. PATENT DOCUMENTS

| | | | | | |
|---|---|---|---|---|---|
| 2,379,722 | A | * | 7/1945 | Kase | A45D 44/08 2/50 |
| 2,665,426 | A | * | 1/1954 | Schmidt | A41D 1/215 2/48 |
| D172,105 | S | * | 5/1954 | Nowell | D2/823 |
| D173,594 | S | * | 11/1954 | Stier | D2/824 |

(Continued)

OTHER PUBLICATIONS

International Search Report of PCT/US2018/025850 dated Jul. 10, 2018, 2 pgs.

(Continued)

*Primary Examiner* — Yvonne R Abbott-Lewis
(74) *Attorney, Agent, or Firm* — Polsinelli PC (57) ABSTRACT

Implementations described and claimed herein provide systems and methods for supporting a pet along trapezii and behind a neck of a user. In one implementation, a core assembly of a bolster has a middle section disposed between a first end section and a second end section, and the middle section positionable behind the neck of the user. An elongated body of the core assembly is positionable along the trapezii of the user in a horizontal orientation. The elongated body extends continuously from the first end to the second end. A padded body of the core assembly extends about the elongated body. A cover is engaged to the core assembly. A securing assembly has a first strap connected to the first end section and a second strap connected to the second end section. The core assembly is releasably securable to the user in the horizontal orientation using the securing assembly.

20 Claims, 13 Drawing Sheets

(56) References Cited

U.S. PATENT DOCUMENTS

| | | | | |
|---|---|---|---|---|
| 2,778,024 | A * | 1/1957 | Randolph | A45D 44/08 2/50 |
| 4,097,086 | A * | 6/1978 | Hudson | B60N 2/882 5/636 |
| 4,139,912 | A * | 2/1979 | Thuaud | A45D 44/08 2/50 |
| D288,029 | S * | 2/1987 | Parr | D2/823 |
| 4,919,081 | A * | 4/1990 | Lewellen | A01K 31/12 2/46 |
| D315,631 | S * | 3/1991 | Ragot | D2/824 |
| 5,277,148 | A * | 1/1994 | Rossignol | A01K 1/0245 119/497 |
| 5,331,921 | A * | 7/1994 | vanVonno | A01K 1/029 2/46 |
| 5,363,803 | A * | 11/1994 | Serro | A01K 31/12 119/537 |
| 5,419,281 | A * | 5/1995 | Williams | A47D 13/025 224/159 |
| 5,445,302 | A * | 8/1995 | Holtorf | A01K 1/029 119/497 |
| 5,465,425 | A * | 11/1995 | Crispin | A41D 13/0012 2/108 |
| D382,091 | S * | 8/1997 | Leahy | D2/823 |
| 5,664,258 | A * | 9/1997 | Harris | A41D 3/08 2/84 |
| D398,719 | S * | 9/1998 | Ferguson | D29/101.2 |
| 5,901,666 | A * | 5/1999 | Belisle | A01K 1/029 119/497 |
| 6,079,055 | A * | 6/2000 | Mencel | A41D 13/0512 2/310 |
| 6,209,134 | B1 * | 4/2001 | Schiesel | A41D 13/04 2/46 |
| 6,450,126 | B1 * | 9/2002 | Schellenbach | A01K 1/029 119/714 |
| 6,484,337 | B1 * | 11/2002 | Moe | A47D 13/083 5/655 |
| 6,701,871 | B1 * | 3/2004 | Johnson | A01K 1/0254 119/500 |
| 6,860,237 | B1 * | 3/2005 | Rohlfing | A01K 31/12 2/16 |
| D510,463 | S * | 10/2005 | Goforth | 119/537 |
| 7,082,617 | B1 * | 8/2006 | Poindexter | A41D 1/215 2/48 |
| 7,117,824 | B2 * | 10/2006 | Holtzworth | A01K 1/029 119/497 |
| D571,538 | S * | 6/2008 | Wolters | D2/823 |
| D591,484 | S * | 5/2009 | Lindh | D2/864 |
| 7,587,773 | B2 * | 9/2009 | Littlehorn | A47C 20/021 5/655 |
| D603,139 | S * | 11/2009 | Martin | D2/823 |
| 7,722,122 | B2 * | 5/2010 | Mittelstadt | A47C 7/383 5/640 |
| 7,758,125 | B2 * | 7/2010 | Mittelstadt | A47C 7/383 5/640 |
| D625,903 | S * | 10/2010 | Conley | D2/864 |
| D629,178 | S * | 12/2010 | Lindsay | D6/601 |
| D632,873 | S * | 2/2011 | Garibay | D2/854 |
| D675,381 | S * | 1/2013 | Rambo | D29/100 |
| 8,973,163 | B1 * | 3/2015 | Kuever | A41D 1/215 2/46 |
| D767,825 | S * | 9/2016 | Georgeson | D29/101.2 |
| 10,085,497 | B2 * | 10/2018 | Douglas | A41D 15/007 |
| D836,251 | S * | 12/2018 | Bynoe | D29/101.2 |
| D907,314 | S * | 1/2021 | Wiedenhoeft | A45F 3/14 D30/199 |
| 2002/0188998 | A1 * | 12/2002 | Yost | A41B 13/10 2/46 |
| 2005/0039702 | A1 * | 2/2005 | Laffoon | A01K 27/00 119/850 |
| 2007/0012261 | A1 * | 1/2007 | Altieri | A01K 1/029 119/770 |
| 2007/0193528 | A1 * | 8/2007 | Scaife | A01K 1/0245 119/497 |
| 2013/0153614 | A1 * | 6/2013 | Wetzsteon | A45F 3/12 224/264 |
| 2015/0351564 | A1 * | 12/2015 | Vogel | A47G 9/1054 5/640 |
| 2017/0020101 | A1 * | 1/2017 | Parker | A01K 1/029 |
| 2017/0172102 | A1 * | 6/2017 | Rivera | A45F 3/04 |
| 2020/0282284 | A1 * | 9/2020 | Searcy | A45B 27/00 |

OTHER PUBLICATIONS

Written Opinion of PCT/US2018/025850 dated Jul. 10, 2018, 6 pgs.
International Preliminary Report on Patentability of PCT/US2018/025850 dated Jul. 10, 2018, 7 pgs.

* cited by examiner

PET PERCH

CROSS-REFERENCE TO RELATED APPLICATIONS

The present application is a continuation-in-part of and claims priority to U.S. Design application Ser. No. 29/642,963, entitled "Pet Perch" and filed on Apr. 3, 2018, which is a continuation of PCT Application No. PCT/US2018/025850, entitled "Pet Perch" and filed on Apr. 3, 2018, which claims priority to U.S. Provisional Patent Application No. 62/482,372, entitled "Shoulder Cat Pet Perch" and filed on Apr. 6, 2017. Each of these applications is hereby incorporated by reference in its entirety into the present application.

FIELD

Aspects of the present disclosure relate generally to pet carriers and more particularly to systems and methods for supporting a pet along the trapezii of a user during transport, rest, activities, and/or the like.

BACKGROUND

Globally, the majority of consumers own one or more household pets. Over the years, pets have evolved to become an integral part of families. Some pets enjoy interaction with their owners to the extent that the pet consistently insists on sitting on the shoulders of the owner. Trying to balance the pet on the shoulders can provide uncomfortable and challenging for the owner, however, particularly after long periods of time. For example, the posture of the owner is often compromised by attempting to keep the pet balanced, and the claws of the pet may dig into the owner in this position. These difficulties are exacerbated when the owner attempts to engage in movement or activities, such as chores, routine activities around the house, and/or the like.

It is with these observations in mind, among others, that various aspects of the present disclosure were conceived and developed.

SUMMARY

Implementations described and claimed herein address the foregoing problems by providing systems and methods for supporting a pet along trapezii and behind a neck of a user. In one implementation, a bolster extends between a first end and a second end. The bolster has a front side disposed opposite a back side and a top side disposed opposite a bottom side. A core assembly of the bolster has a middle section disposed between a first end section and a second end section, and the middle section positionable behind the neck of the user. An elongated body of the core assembly is positionable along the trapezii of the user in a horizontal orientation. The elongated body extends continuously from the first end to the second end. A padded body of the core assembly extends about the elongated body. A cover has a first side and a second side, and the cover is engaged to the core assembly. A securing assembly has a first strap connected to the first end section and a second strap connected to the second end section. The core assembly is releasably securable to the user in the horizontal orientation using the securing assembly.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for supporting a pet. In one aspect, a perch includes a bolster positioned in a horizontal orientation extending along the trapezii of a user. For example, the bolster may extend between the shoulders of the user behind the neck. A securing assembly releasably secures the bolster to the user and maintains the bolster in the horizontal orientation. The bolster forms a seat for a pet to use and evenly distributes a weight of the pet across the trapezii of the user. The maintenance of the bolster in the horizontal orientation permits the user to: perform various activities unrestricted, provide hands-free transport and support of the pet, and maintain proper posture, among other benefits. Further, the bolster provides an unrestricted seat, such that the pet may sit, turn, move, leave, and/or the like, as desired and without assistance from or involvement by the user. A cover may further be connected to the bolster, providing protection to the body of the user and the clothes of the user from sharp anatomy of the pet, as well as from debris. As such, the perch provides a safe location for the pet to interact with a user without restricting, discomforting, or inconveniencing the user or the pet.

Figure 1A:
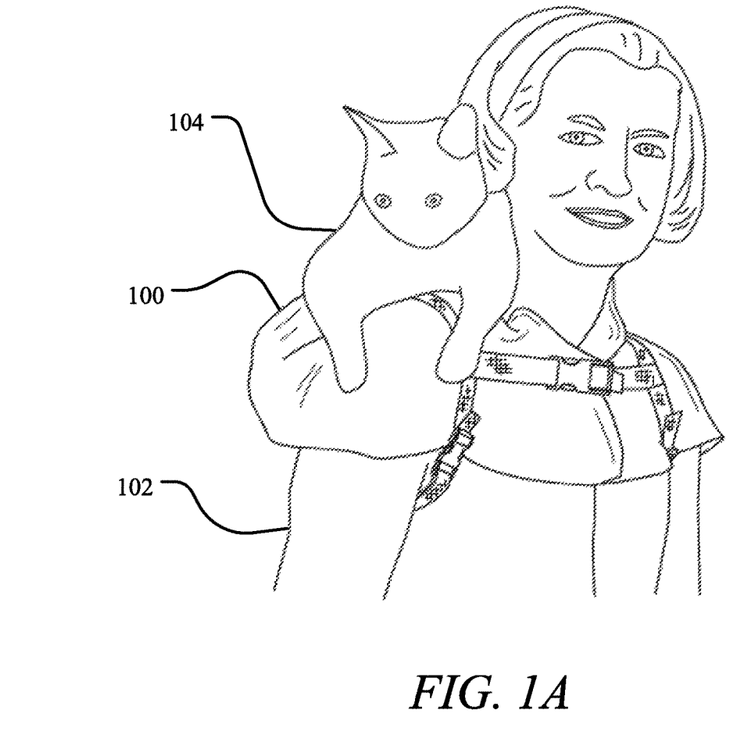
FIGS. 1A and 1B illustrate a perspective view and a back view, respectively, of a user wearing an example perch to support a pet.
Figure 1B:
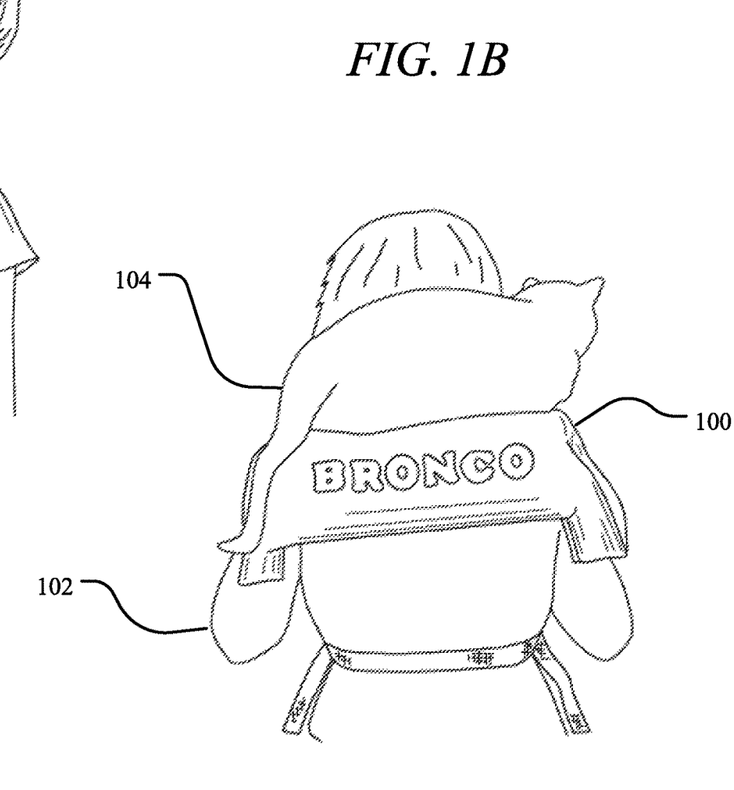
Figure 2:
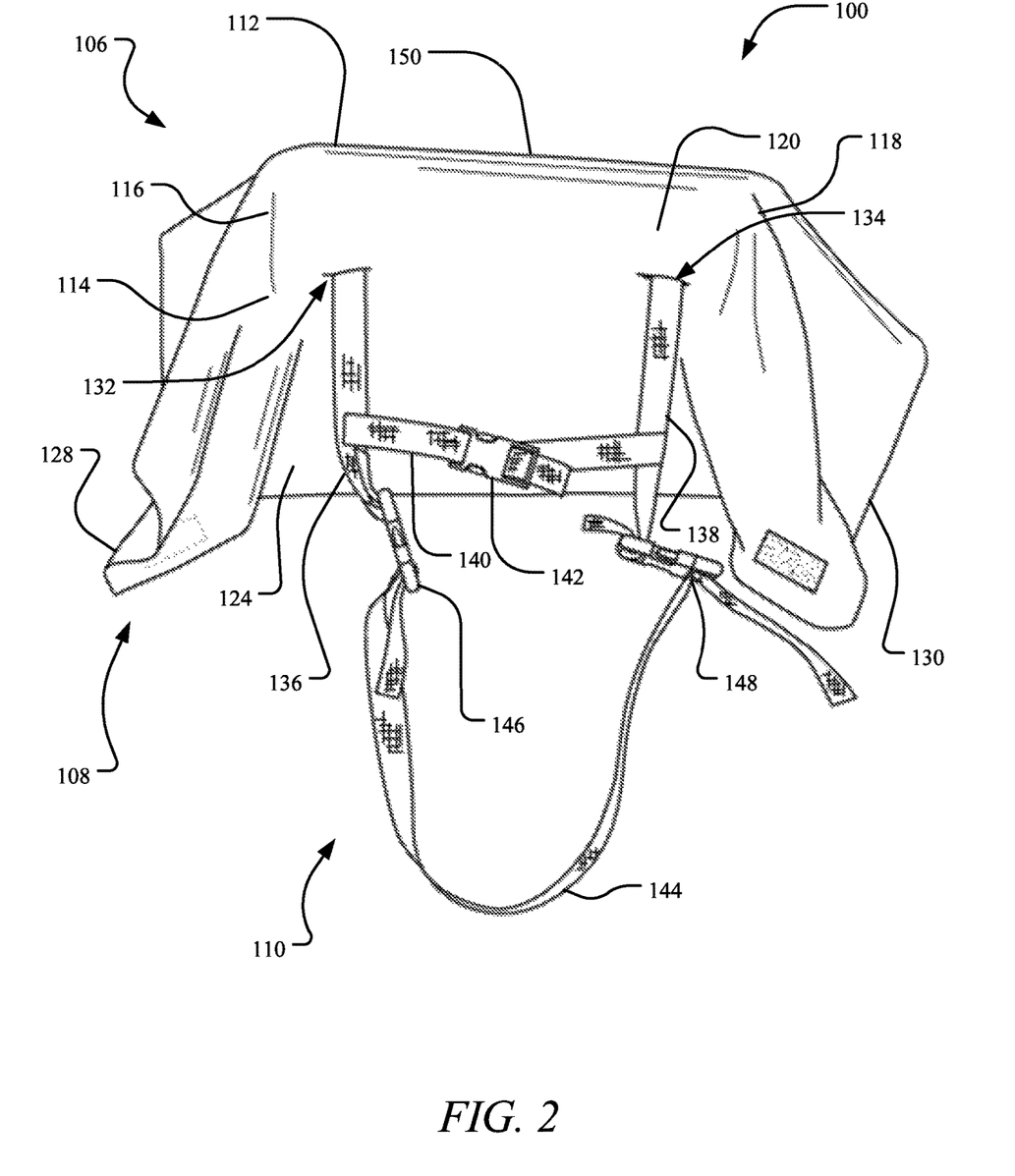
FIG. 2 shows a front view of the perch.
Figure 3:
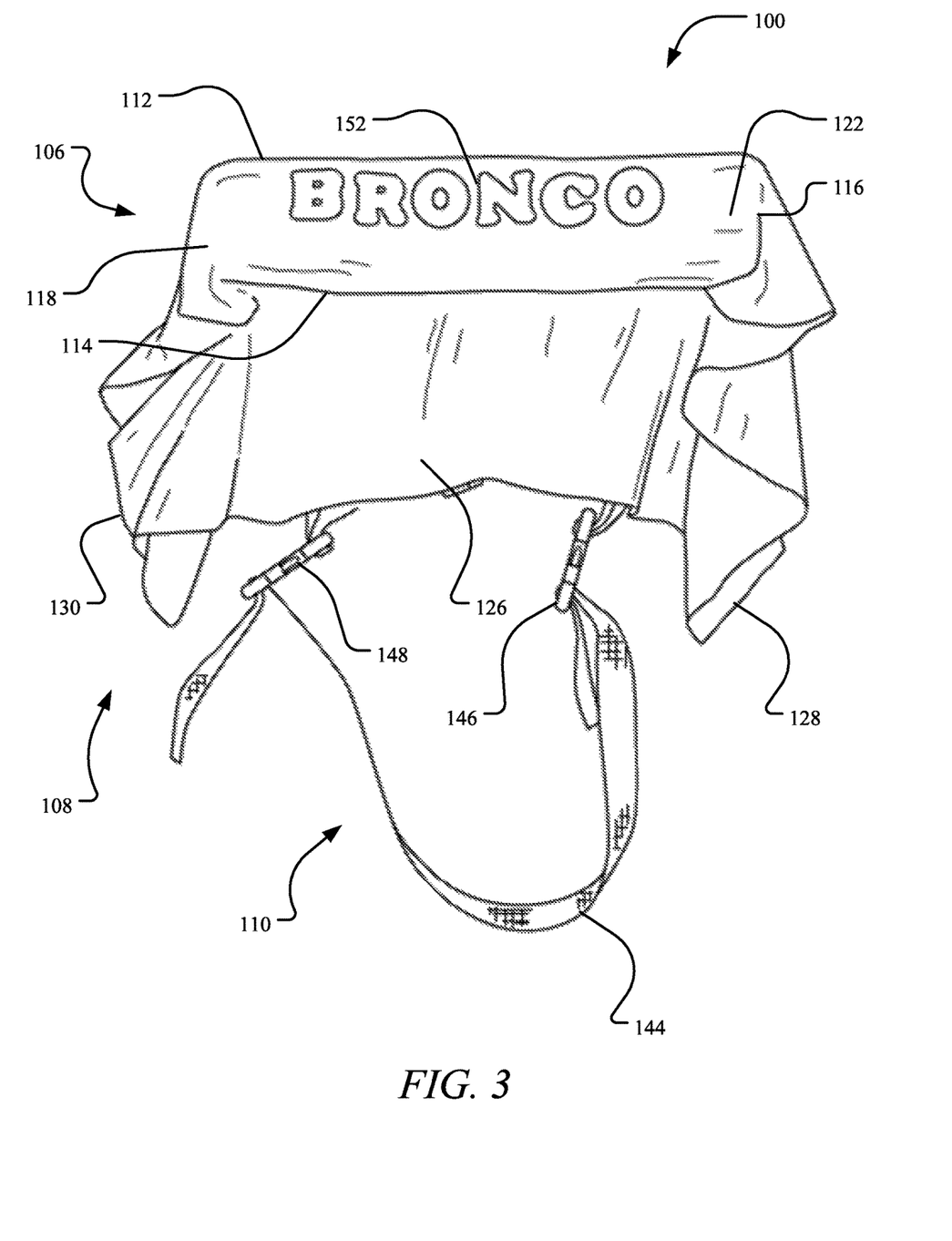
FIG. 3 is a back view of the perch.
Figure 4:
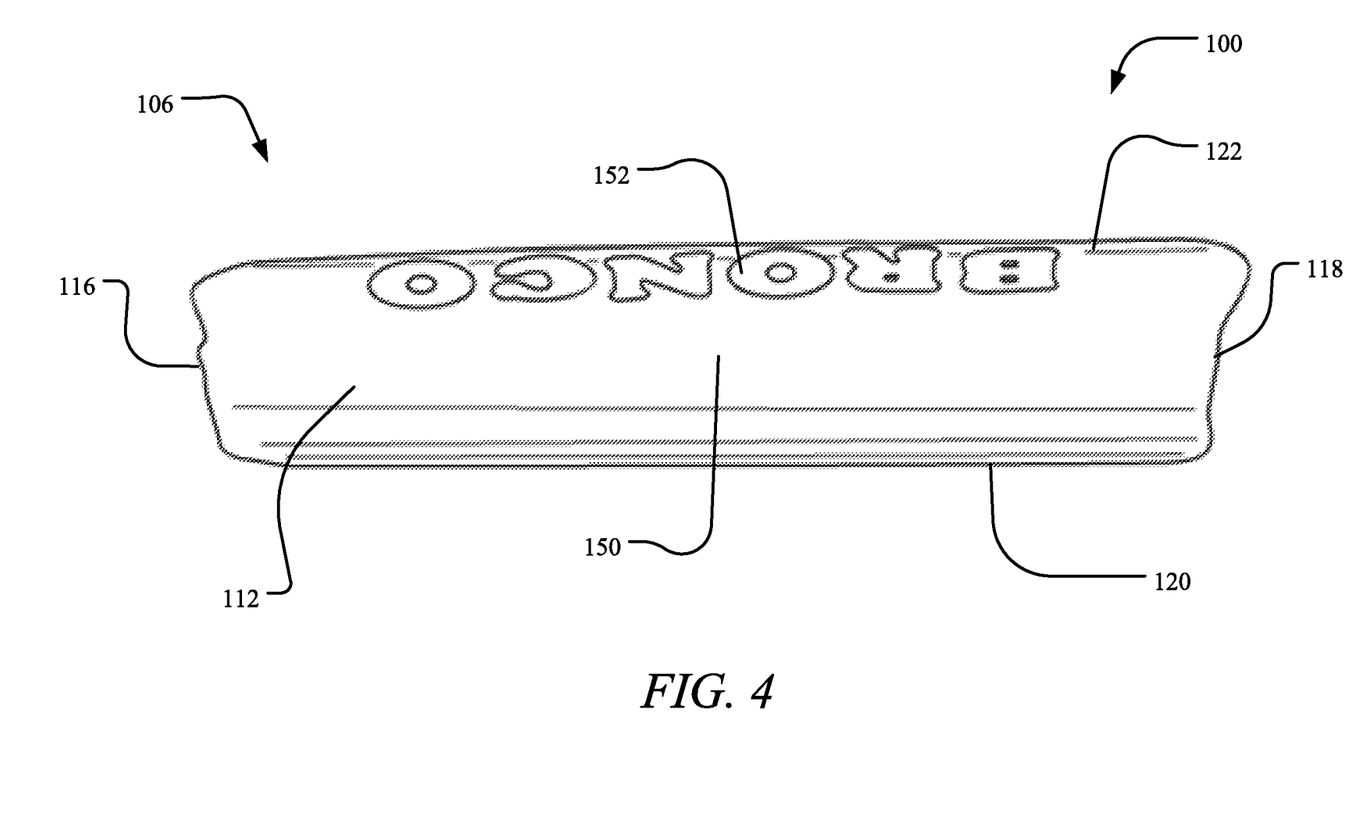
FIG. 4 depicts a top view of the perch.
Figure 5:
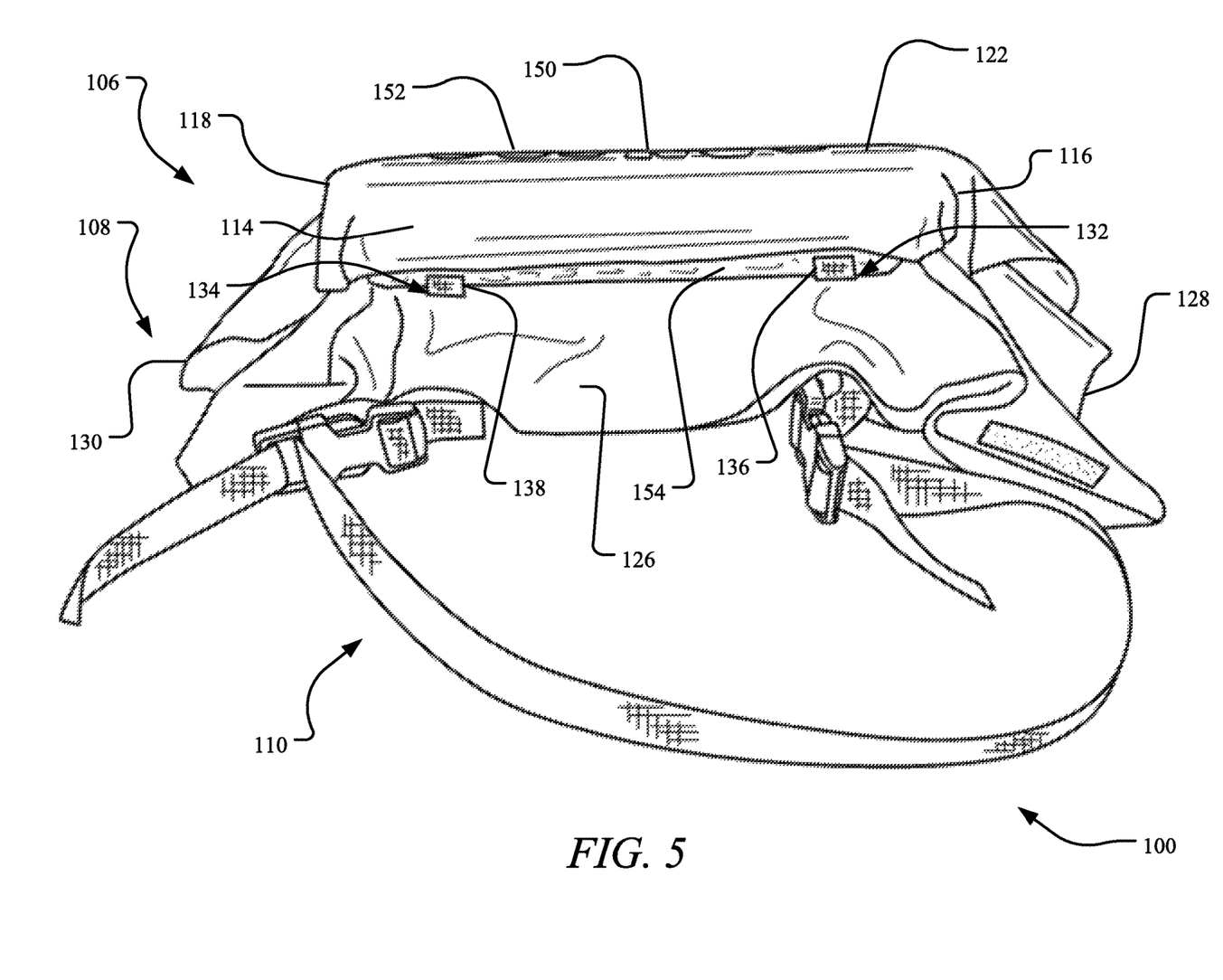
FIG. 5 shows a bottom perspective view of the perch.
Figure 6:
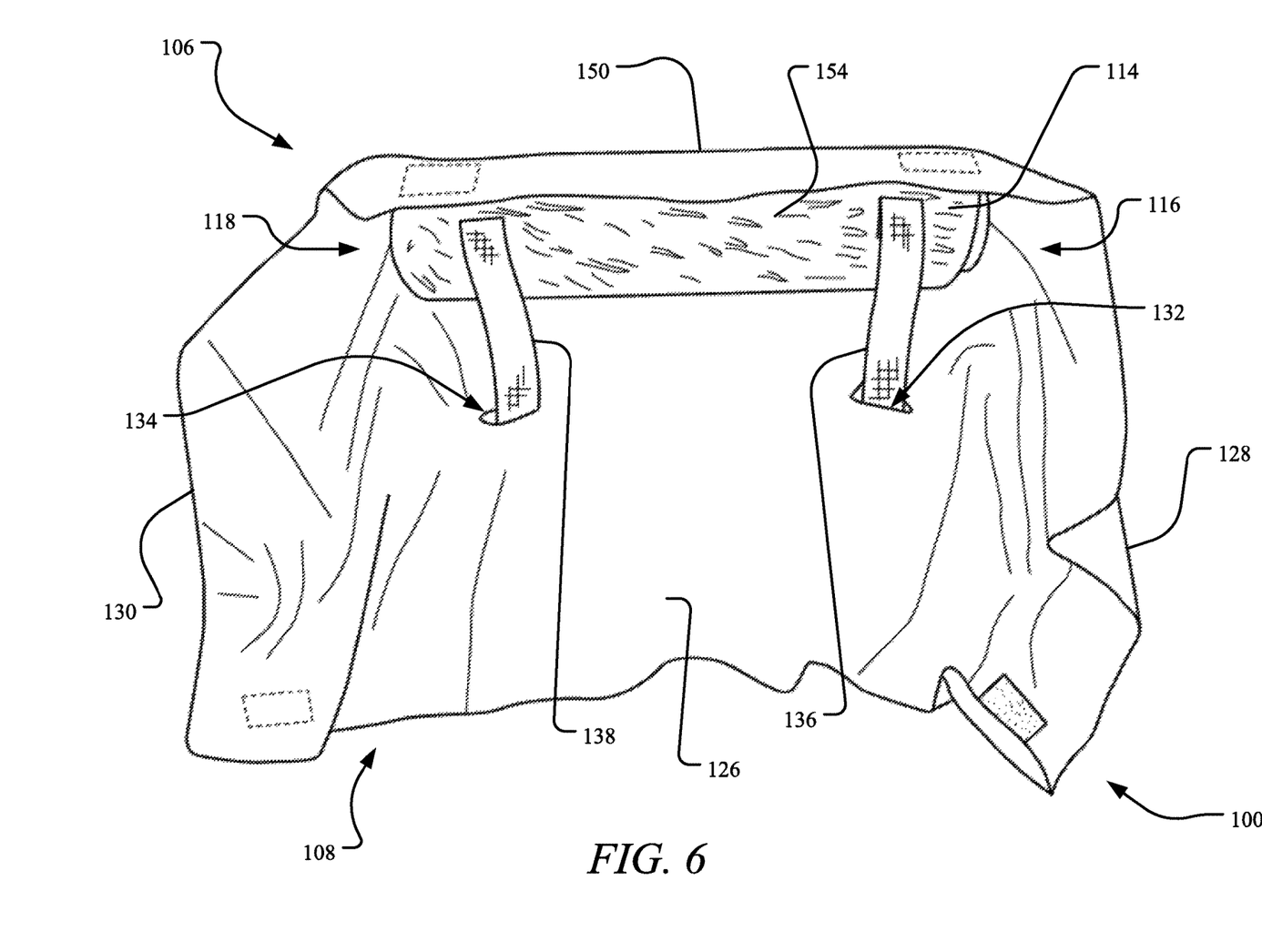
FIG. 6 is a bottom perspective view of the perch showing a core assembly.

To begin a detailed description of an example perch 100, reference is made to FIG. 1. In one implementation, the perch 100 is releasably secured to a user 102 in a horizontal orientation, forming a seat for one or more pets 104 to use. The pet(s) 104 may include, without limitation, one or more felines, canines, rabbits, amphibians, and/or other animals. The perch 100 positions the pet 104 on the shoulders of the user 102 near the head, where many animals desire to sit for interacting with the user 102, removing themselves from their environment (e.g., in the presence of other animals with which they do not wish to interact), and resting. The seat formed by the perch 100 is unrestricted, such that the pet 104 may lay, sit, turn, arrive, leave, and/or otherwise move, as desired and without assistance from or involvement by the user 102.

In addition to providing a safe, unrestricted, and comfortable seat for the pet 104, the perch 100 optimizes comfort without hindering movement by the user 102. More particularly, the perch 100 distributes a weight of the pet 104 evenly across the trapezii of the user 102, such that the pet 104 is supported without sacrificing the posture of the user 102, particularly over extended periods of time. The perch 100 provides hands-free support of the pet 104, enabling the user 102 to perform various activities and move unrestricted. In one implementation, the perch 100 further protects the skin, clothes, and accessories of the user 102 from sharp anatomy of the pet 102, such as claws, nails, scales, teeth, and/or the like, as well as from debris, including dander, shedding, dirt, and bodily fluids.

All or a portion of the perch 100 may be disassembled to facilitate cleaning or interchanging of various components. Additionally, the perch 100 may be customizable in size and/or shape to accommodate different sizes of the pet 104 or the user 102. The perch 100 may further facilitate customization of aesthetic content. For example, content, such as the name of the pet 104, a description of a role of the pet 104 (e.g., "Therapy Animal"), the name of the user 102, and other words, phrases, names, designs, etc., may be displayed with the perch 100. Additionally, the perch 100 may incorporate various interchangeable colors, designs, patterns, graphics, and/or the like.

Turning to FIGS. 2-6, in one implementation, the perch 100 includes a bolster 106 connected to a cover 108 and a securing assembly 110. The bolster 106 may be releasably connected or fixed to the cover 108 and/or the securing assembly 110. The bolster 106 extends from a first end 116 to a second end 118 along a longitudinal axis. The bolster 106 includes a front side 120 disposed opposite a back side 122 and a top side 112 disposed opposite a bottom side 114.

In one implementation, the bolster 106 includes a core assembly 154 having a middle end section 150 disposed between a first end section and a second end section. Stated differently, the core assembly 154 includes the first end section extending from the first end 116 to the middle section 150 and the second end section extending from the second end 118 to the middle section 150. In one implementation, when the perch 100 is positioned in the horizontal orientation, the bolster 106 extends along the trapezii of the user 102 with the middle section 150 of the core assembly 154 disposed behind the neck of the user 102. In the horizontal orientation, the top side 112 of the core assembly 154 of the bolster 106 forms the seat for the pet 104.

The core assembly 154 of the bolster 106 may be releasably connected (e.g., via one or more sets of paired hook and loop fasteners, pins, snaps, etc.) or fixed to the cover 108 (e.g., via sewing, adhesives, etc.). For example, the cover 108 may be removable from the core assembly 154 for cleaning or interchanging with another cover. The cover 108 may have a variety of colors, patterns, designs, graphics, and/or other aesthetic features. For example, the cover 108 may include content 152, such as names, words, phrases, designs, logos, graphics, and/or the like. In one implementation, the content 152 is displayable on the cover 108 at the back side 122 of the bolster 106. However, other locations for displaying content are contemplated. The cover 108 may be made from a variety of materials adapted to resist penetration by sharp anatomy of the pet 104 and to otherwise protect the skin, clothes, and accessories of the user 102. For example, the cover 108 may be made from fabric, leather, fur, plastic, rubber, and/or other synthetic or natural materials.

In one implementation, the cover 108 includes a first side 124 and a second side 126. The cover 108 may be connected to the core assembly 154, for example, at the bottom side 114, and wrapped about the core assembly 154, forming a wrapped section and a draped section. The wrapped section includes the portion of the cover 108 wrapping about the core assembly 154, and the draped section includes the portion of the cover 108 hanging distally from the core assembly 154. In one implementation, the wrapped section includes the second side 126 facing inwardly towards the core assembly 154 and the first side 124 facing outwardly from the core assembly 154. The second side 126 may include one or more strips of material or other mechanical components for releasably connecting to the core assembly 154.

The draped section of the cover 108 may include a first wing 128 and a second wing 130 connected by a middle drape. In one implementation, the first wing 128 includes a first collection of material of the cover 108 extending and hanging from the first end 116 of the bolster 106, and the second wing 130 includes a second collection of material of the cover 108 extending and hanging from the second end 118 of the bolster 106. The middle drape may include the first side 124 of the cover 108 facing in a direction towards the user 102 and the second side 126 facing in a direction away from the user 102.

The cover 108 may accommodate a connection of the core assembly 154 to the securing assembly 110. For example, the cover 108 includes a first opening 132 and a second opening 134 to accommodate one or more portions of the securing assembly 110. In one implementation, the securing assembly 110 includes a first strap 136 and a second strap 138. The first strap 136 may be separate from, connectable to, and/or integral with the second strap 138. In one implementation, the first strap 136 is releasably connected to the second strap 138 via a proximal strap 140 having a releasable connection 142, such as a buckle. In another implementation, the first strap 136 and the second strap 138 form a single strap. A distal strap 144 may be releasably connected to the first strap 136 and the second strap 138 via releasable connections 146 and 148, respectively.

The first strap 136 may extend through the first opening 132 and connect to the core assembly 154, and the second strap 138 may extend through the second opening 134 and connect to the core assembly 154. In one implementation, the first strap 136 is connected to the core assembly 154 at the first end section, and the second strap 138 is connected to the core assembly 154 at the second end section. The first strap 136 and the second strap 138 may each be connected to the core assembly 154 at the bottom side 114 of the bolster 106.

Figure 7:
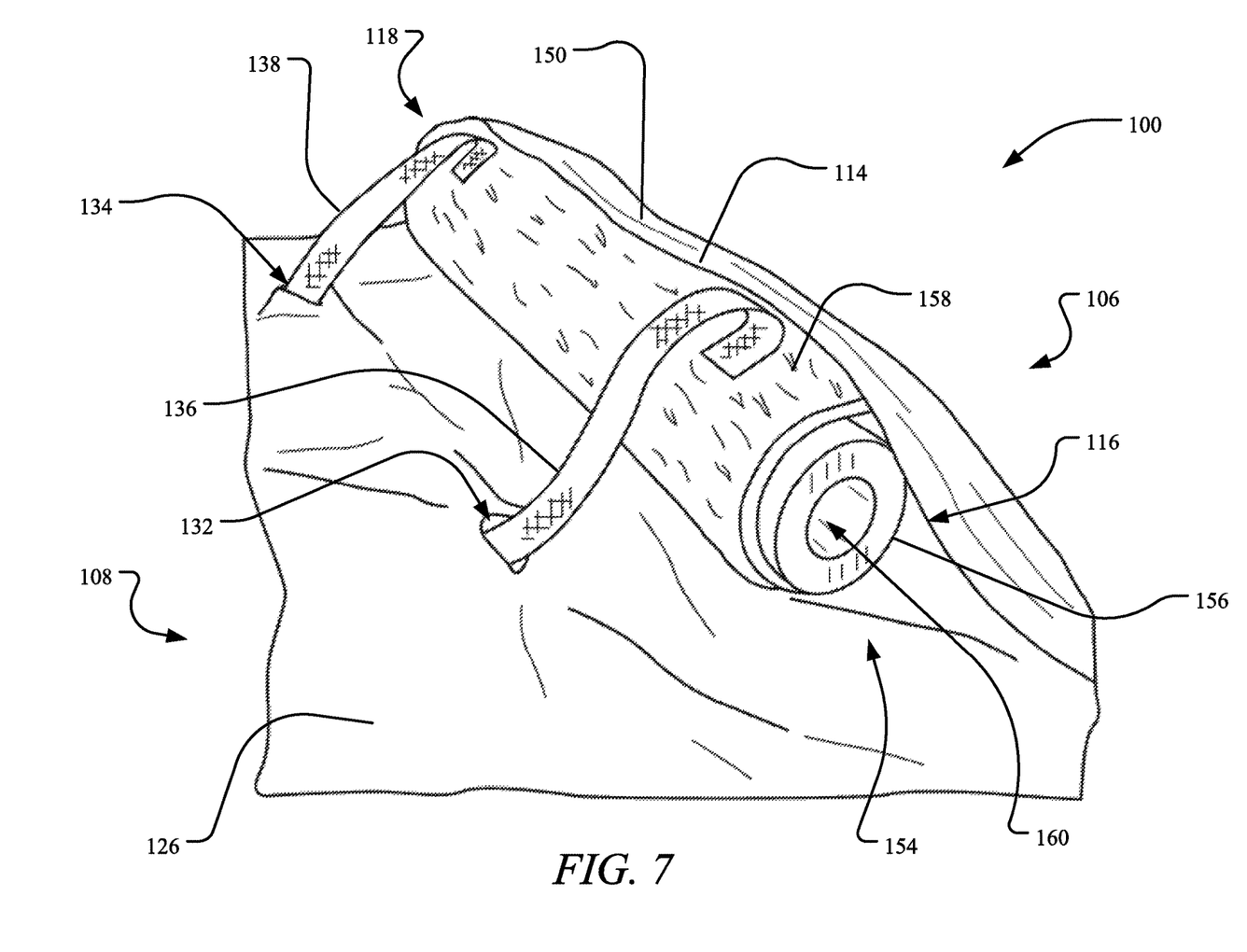
FIG. 7 illustrates a side perspective view of the perch showing the core assembly.
Figure 8:
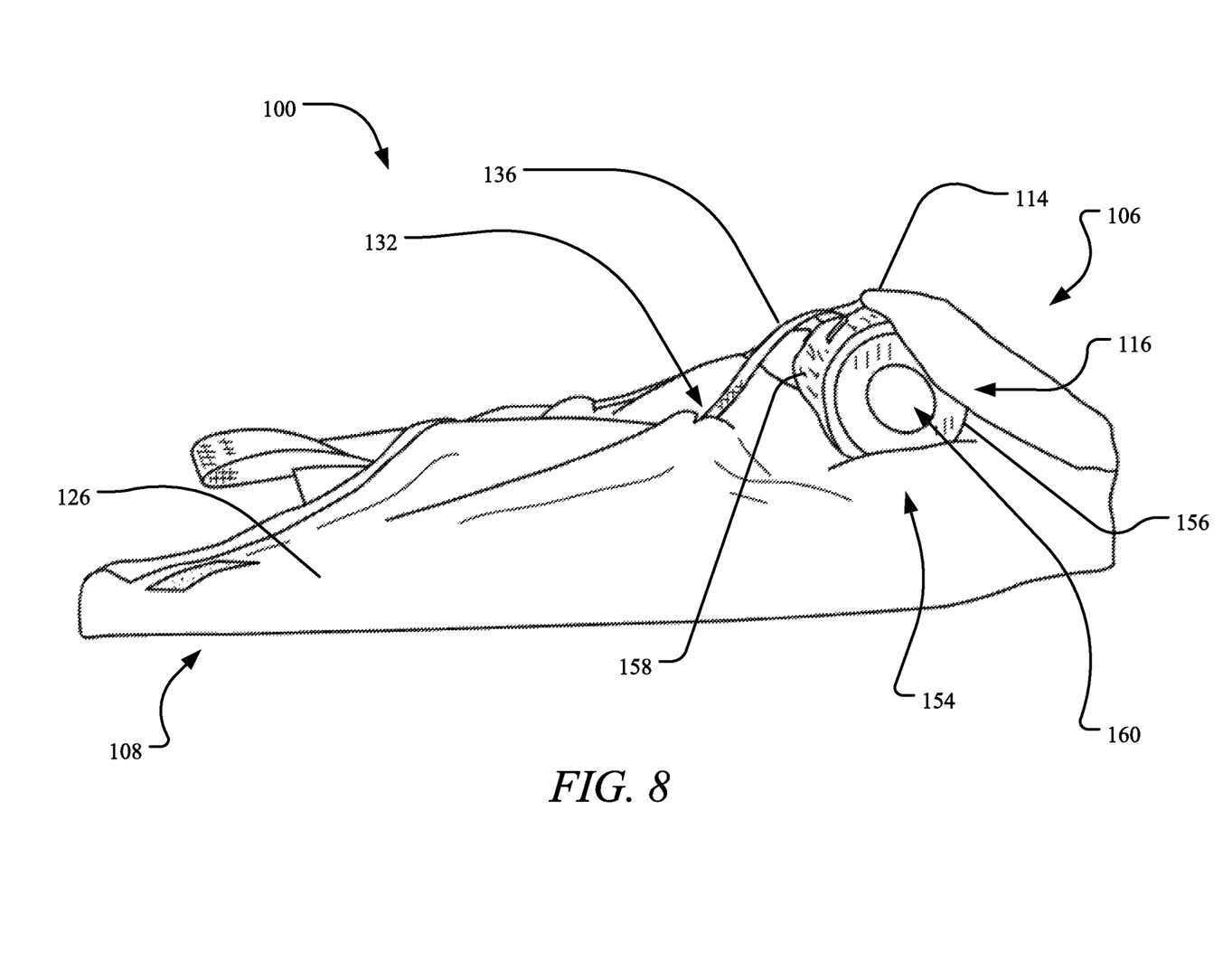
FIG. 8 shows a side view of the perch showing the core assembly.

As can be understood from FIGS. 7-8, in one implementation, the core assembly 154 includes an elongated body 156 extending between the first end 116 and the second end 118. The elongated body 156 may extend continuously between the first end 116 and the second end 118 as an integral piece or be broken into separate pieces. The elongated body 156 may have a variety of shapes and sizes. For example, the elongated body 156 may be cylindrical, conical, cubical, polygonal, pyramidal, ellipsoidal, spherical, curved, angled, flat, and/or the like. In one implementation, the first section, the second section, and the middle section 150 of the elongated body 156 each have the same cross-sectional shape. The elongated body 156 may be made from a variety of materials, including foam (e.g., polyethylene foam), plastic, rubber, fabric, and/or other lightweight and rigid materials. The elongated body 156 is adapted to flex and absorb force while evenly distributing a weight of the pet 104 across the trapezii of the user 102 to maximize comfort. A lumen 160 may extend through the elongated body 156 to further decrease weight.

In one implementation, the core assembly 154 includes a padded body 158 extending about the elongated body 156. The padded body 158 may be integral with the elongated body 156 or be separate from the elongated body 156, such that the padded body 158 extends about a surface of the elongated body 156. The padded body 158 may include an inner surface and an outer surface. The inner surface may be positioned adjacent to an outer surface of the elongated body 156. The inner surface may be fixed to or loose from the elongated body 156. The outer surface of the padded body 158 may include one or more releasable or fixed connection points for connecting to the cover 108 and/or the straps 136 and 138.

Figure 9:
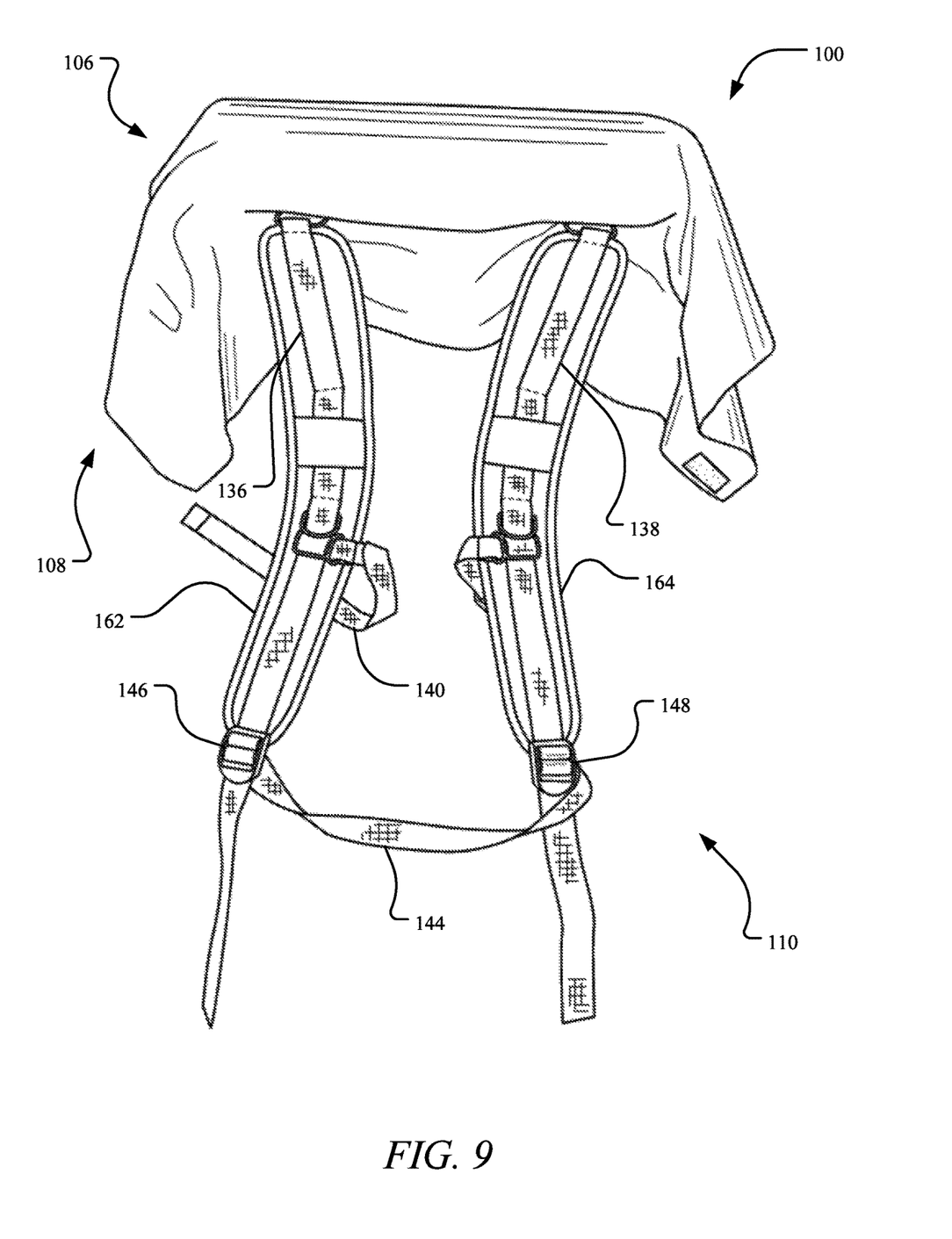
FIGS. 9 and 10 are a front view and a back view, respectively, of an example perch having strap pads.
Figure 10:
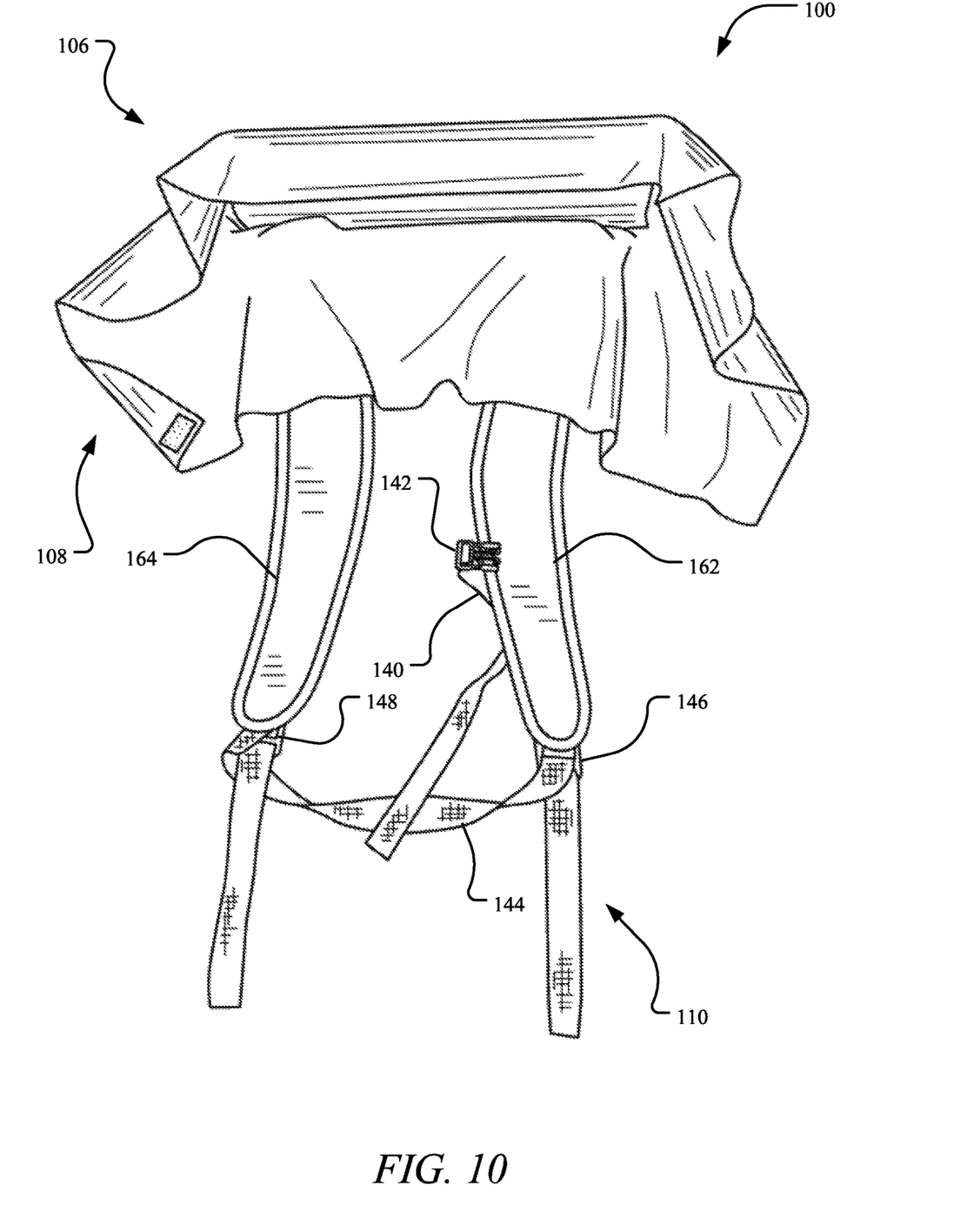

Referring to FIGS. 9-10, in one implementation, the first strap 136 includes a first strap pad 162 and the second strap 138 includes a second strap pad 164. The first strap pad 162 may be positioned behind the first strap 136, and the second strap 138 may be positioned behind the second strap 138 for enhanced comfort for the user 102.

Figure 11:
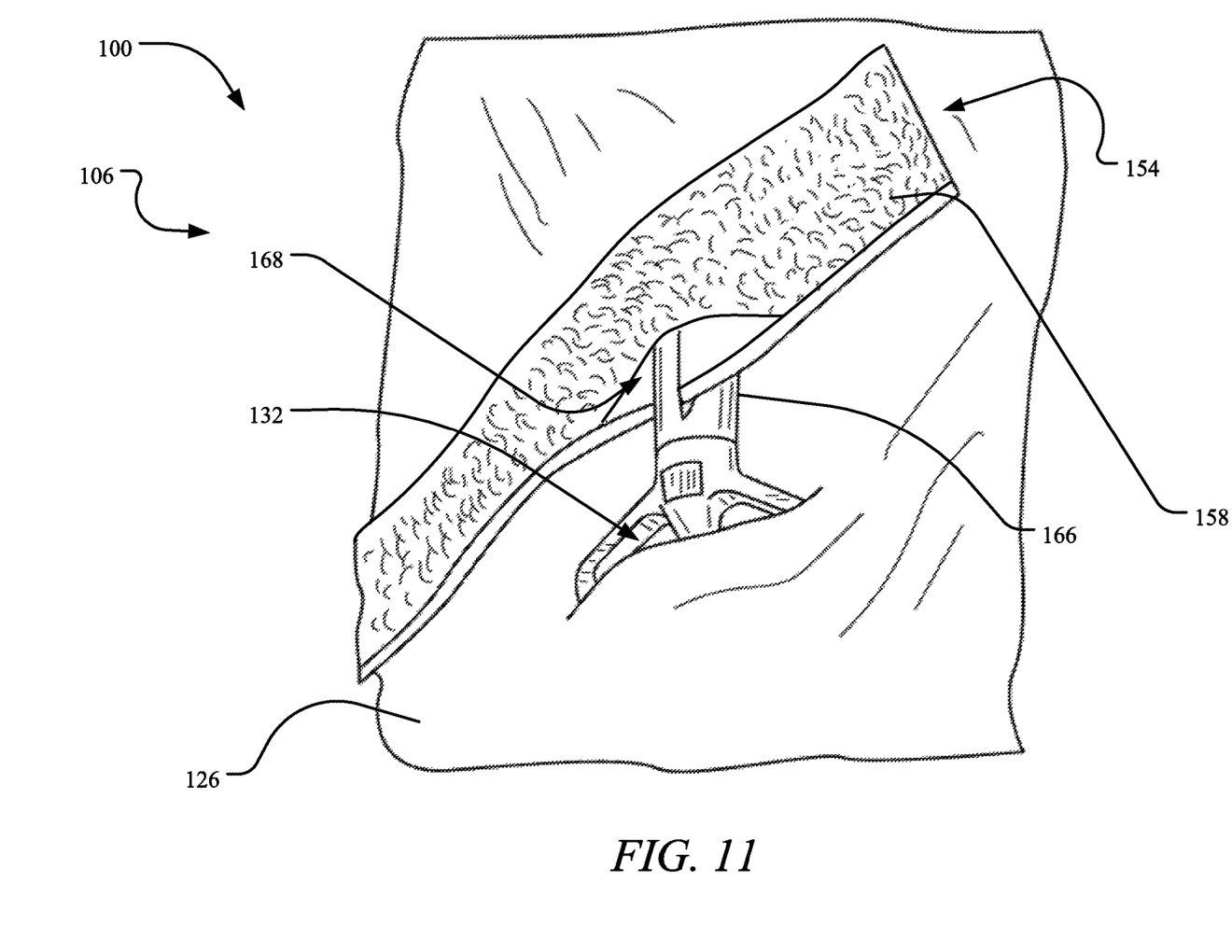
FIG. 11 depicts a detailed view of an example releasable strap connection.
Figure 12:
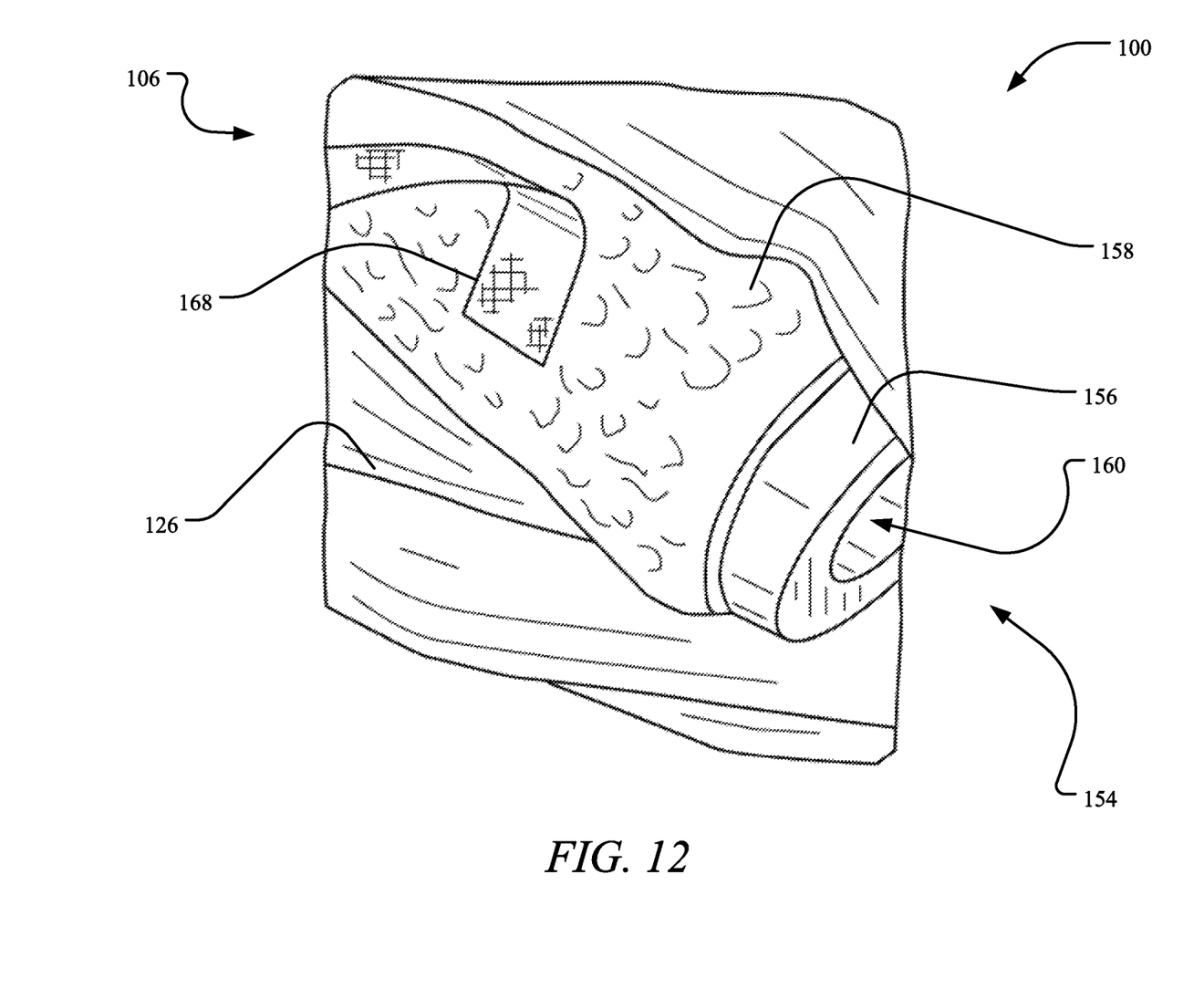
FIG. 12 shows a detailed view of an exampled fixed strap connection.

As described herein, the first strap 136 and the second strap 138 may be fixed or releasably connected to the core assembly 154. Turning to FIG. 11, in one implementation, the padded body 158 includes an opening 168 adapted to releasably receive and engage a connector 166 of one of the straps 136 or 138. The connector 166 may be a buckle, hook, clip, snap, and/or other releasable connectors. In another implementation shown in FIG. 12, each of the straps 136 and 138 are connected to the padded body 158 or other portion of the core assembly 154 with a fixed connection 168, such as stitching, adhesive, and/or the like.

Figure 13:
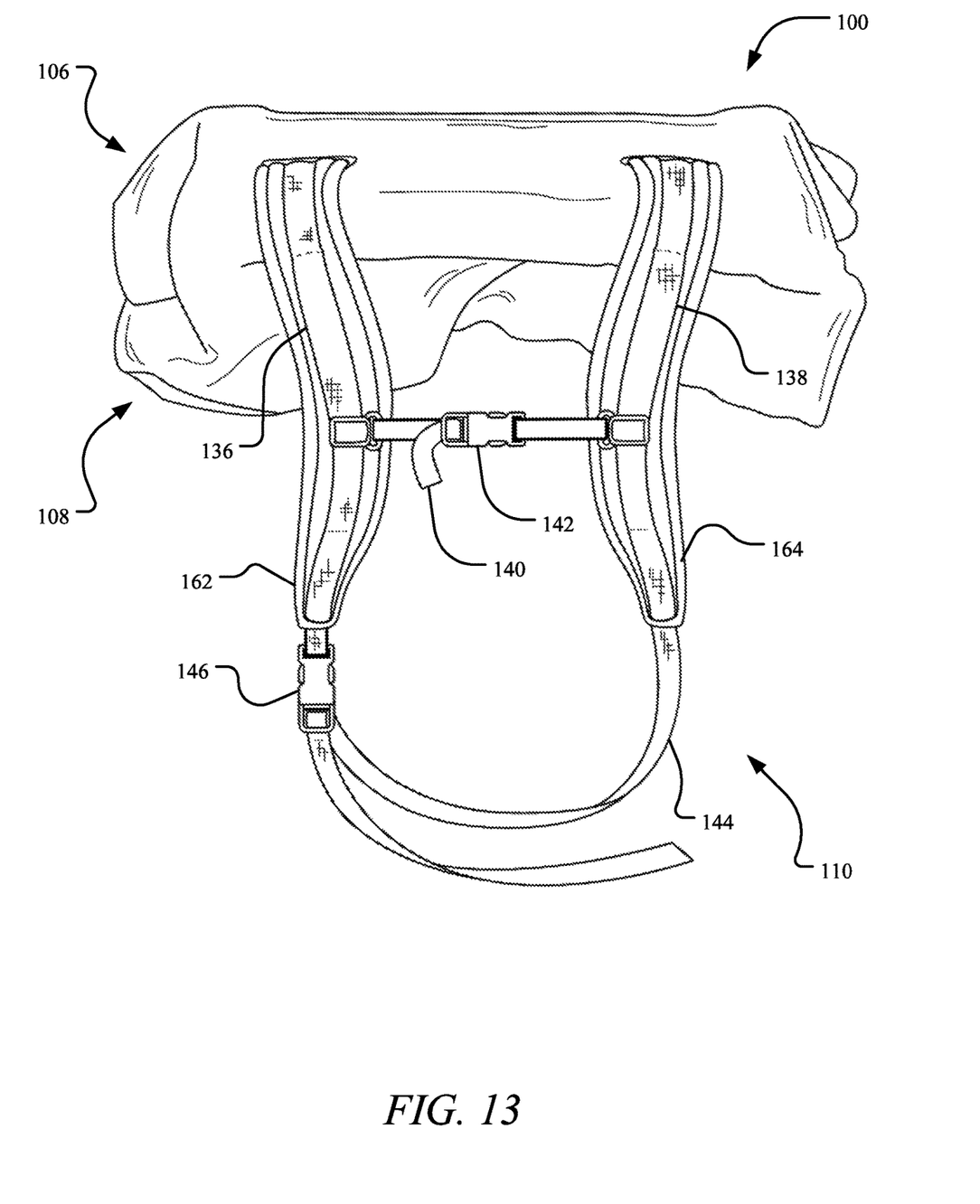
FIG. 13 is a front view of an example perch having an example releasable distal strap.

Turning to FIG. 13, in one implementation, the first strap 136 includes the first strap pad 162 and the second strap 138 includes the second strap pad 164. The first strap pad 162 may be positioned behind the first strap 136, and the second strap 138 may be positioned behind the second strap 138. The first strap 136 may be releasably connected to the distal strap 144 via the releasable connection 146 which may be, for example, a buckle. The distal strap 144 may also be adjustable via the releasable connection 146 for proper fitting of the distal strap 144 to the user. The distal strap 144 may be disconnected from the first strap 136 by the releasable connection 146 to facilitate installation and positioning of the perch 100 on the shoulder of the user. The distal strap 144 may be connected to the second strap 138 so that the distal strap 144 remains connected to the securing assembly 110 during installation and positioning of the perch 100.

Based upon design preferences, it is understood that the specific order or hierarchy of steps in the methods described herein can be rearranged while remaining within the disclosed subject matter. Any accompanying method claims present elements of the various steps in a sample order and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A perch for supporting a pet along trapezii and behind a neck of a user, the perch comprising:
 a bolster extending between a first end and a second end, the bolster having a front side disposed opposite a back side and a top side disposed opposite a bottom side;
 a core assembly of the bolster, the core assembly having a middle section disposed between a first end section and a second end section, the middle section positionable behind the neck of the user, the core assembly extending continuously from the first end to the second end;
 an elongated body of the core assembly positionable along the trapezii of the user in a horizontal orientation, the elongated body extending continuously from the first end to the second end;
 a padded body of the core assembly, the padded body extending about the elongated body and extending continuously from the first end to the second end;
 a cover having a first side and a second side, the cover wrapped about the core assembly; and
 a securing assembly having a first strap connected to the first end section and a second strap connected to the second end section, the core assembly releasably securable to the user in the horizontal orientation using the securing assembly.

2. The perch of claim 1, wherein the cover is releasably engaged to the core assembly.

3. The perch of claim 2, wherein the cover is releasably engaged to the core assembly with one or more sets of paired hook and loop fasteners.

4. The perch of claim 1, wherein the cover includes a wrapped section and a draped section when the cover is engaged to the core assembly.

5. The perch of claim 4, wherein the wrapped section wraps about the core assembly and the draped section hangs distally from the core assembly.

6. The perch of claim 4, wherein the draped section includes a first wing and a second wing connected by a middle drape.

7. The perch of claim 1, wherein the cover includes a first opening and a second opening, the first strap extending through the first opening and the second strap extending through the second opening.

8. The perch of claim 1, wherein the padded body is separate from and extends about a surface of the elongated body.

9. The perch of claim 1, wherein the padded body is integral with the elongated body.

10. The perch of claim 1, wherein a first strap pad is positioned relative to the first strap and a second strap pad is positioned relative to the second strap.

11. The perch of claim 1, the top side of the core assembly forms a seat for the pet.

12. The perch of claim 1, wherein the pet is a feline, a canine, a rabbit, a rodent, an amphibian, or a reptile.

13. The perch of claim 1, wherein the first strap and the second strap are each connected to the core assembly at the bottom side of the bolster.

14. The perch of claim 1, wherein the elongated body is adapted to evenly distribute a weight of the pet along the trapezii of the user.

15. The perch of claim 1, wherein the elongated body includes a lumen extending therethrough.

16. The perch of claim 1, wherein the first strap and the second strap form a single strap.

17. The perch of claim 1, wherein the first end section, the second end section, and the middle section of the elongated body each have a same cross-sectional shape.

18. The perch of claim 1, wherein the elongated body is cylindrical in shape.

19. The perch of claim 1, wherein content is displayable on the cover at the back side of the bolster.

20. The perch of claim 1, wherein the first strap is releasably connected to the first end section and the second strap is releasably connected to the second end section.

\* \* \* \* \*